United States Patent
McCauley et al.

(10) Patent No.: US 6,383,979 B1
(45) Date of Patent: May 7, 2002

(54) CATALYST AND PROCESS FOR PREPARING AND USING SAME

(75) Inventors: John R. McCauley, Louisville; J. Gary McDaniel, Bel Air, both of MD (US); Ranier Schödel, Halle (DE); Peter Birke, Langenbogen (DE); Michael Keck, Reichardtswerben (DE)

(73) Assignee: Tricat industries, Inc., Hunt Valley, MD (US)

( * ) Notice: Subject to any disclaimer, the term of this patent is extended or adjusted under 35 U.S.C. 154(b) by 0 days.

(21) Appl. No.: 09/131,873

(22) Filed: Aug. 10, 1998

Related U.S. Application Data

(60) Provisional application No. 60/055,489, filed on Aug. 12, 1997.

(51) Int. Cl.[7] ............................ B01J 23/72; B01J 23/44; B01J 23/42; B01J 23/70
(52) U.S. Cl. ..................... 502/331; 502/339; 502/345
(58) Field of Search ................ 502/331, 339, 502/345

(56) References Cited

U.S. PATENT DOCUMENTS

| | | | | | |
|---|---|---|---|---|---|
| 2,499,255 A | * | 2/1950 | Parker | ...................... | 208/124 |
| 2,690,457 A | * | 9/1954 | Hackmann | ................... | 502/345 |
| 4,115,251 A | * | 9/1978 | Flanders et al. | ............ | 208/120 |
| 4,153,535 A | * | 5/1979 | Vasalos et al. | .............. | 208/120 |
| 4,199,436 A | * | 4/1980 | Courty | ....................... | 208/124 |
| 4,238,317 A | * | 12/1980 | Vasalos et al. | .............. | 208/120 |
| 5,068,477 A | * | 11/1991 | Berrebi | ....................... | 585/274 |
| 5,457,079 A | * | 10/1995 | Itabashi et al. | ............. | 502/331 |
| 5,507,956 A | * | 4/1996 | Bonse et al. | ................. | 210/757 |
| 5,543,379 A | * | 8/1996 | Gubitosa et al. | ........... | 502/184 |
| 5,849,662 A | * | 12/1998 | Praserthdam | ............... | 502/330 |
| 5,851,948 A | * | 12/1998 | Chuang et al. | ............. | 502/314 |

* cited by examiner

*Primary Examiner*—Mark L. Bell
*Assistant Examiner*—Patricia L. Hailey
(74) *Attorney, Agent, or Firm*—McDermott, Will & Emery

(57) ABSTRACT

The invention is a catalyst composition and process for making and using the catalyst composition. The catalyst composition promotes the combustion of carbon monoxide to carbon dioxide. The catalyst composition includes an effective concentration of Group VIII transition metal, such as palladium, an effective concentration of Group IB transition metal, such as copper, and a support, such as microspheroidal alumina.

6 Claims, No Drawings

CATALYST AND PROCESS FOR PREPARING AND USING SAME

RELATED APPLICATIONS

This application claims priority from provisional application Ser. No. 60/055,489, filed Aug. 12, 1997, entitled CATALYST AND PROCESS FOR PREPARING AND USING SAME, the entire disclosure of which is hereby incorporated herein by reference.

TECHNICAL FIELD

The present invention relates to a cracking catalyst additive and process for preparing the cracking catalyst additive. Particularly, this invention relates to a fluid cracking catalyst additive ("FCC additive") for promoting the combustion of carbon monoxide to carbon dioxide in the regeneration of a fluid cracking catalyst.

BACKGROUND ART

Catalyst manufacturers are continuously seeking catalysts, additives, and processes to improve the properties of catalysts and additives to lower the cost of producing catalysts and additives. Catalyst and additive producers, typically, search for materials, equipment, or processes that decrease the cost of raw materials or utilities, or increase the efficiency of the catalyst process with increased feed through-put, lower equipment maintenance, or improved utilization of raw materials. All these factors contribute to the manufacturing costs of catalysts and additives.

The use of transition metals in specific fluid cracking catalyst formulations can improve the selectivity of a given fluid cracking catalyst unit, using a specific gas oil feed, but results in undesired concentrations of coke and yields of light gas. The undesirable loss of gasoline yield and increases in coke and light gases with transition metal formulations diminishes the value of the enhanced production of desirable products such as olefins.

Rare earth complex oxide combustion catalysts have been proposed in U.S. Pat. No. 5,242,881 to Tang et al. In this patent, perovskite-type rare earth complex oxide active components are carried on a support using mullite as the main phase. In the prior art section of the Tang et al. patent, the use of perovskite-type rare earth complex oxides as active components of a catalyst have attracted wide attention due to their catalytic oxidizing function for carbon monoxide and hydrocarbons. The Tang et al. patent further states that catalysts using perovskite-type complex oxides as the active components are generally carried on $\gamma$-$AL_2O_3$. These supports are noted to inevitably react chemically with the complex oxide. As a result, aluminum-containing perovskite or aluminum-containing spinel with non-catalytic activity is formed, causing part of the active components to be damaged, so that the activity of the catalysts dropped universally. Attempts have been made to solve the problem by precoating or using the active components as catalysts alone without support. The Tang et al. patent solves these problems by using a support with mullite as a main phase for a perovskite-type active component having the following general formula:

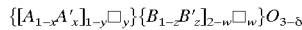

wherein A represents a rare earth metal element, preferably La, Ce or mixed rare earths and most preferably, La or Ce; A' represents an alkaline earth metal element, preferably Ca, Sr or Ba and most preferably Ca or Sr; □ represents the vacancy in the structure; B and B' represent the transition metal elements, preferably Ti, Cr, Co, Mn, Cu, Fe or Ni, and most preferably Ti, Cr, Co or Mn; $0 \leq x \leq 0.9$; $0 \leq y \leq 0.2$; $0 \leq z \leq 0.9$; $0 \leq w \leq 0.05$; $0 \leq \delta \leq 0.8$. And a support with mullite as the main phase, wherein the said active components are carried directly on the said support.

U.S. Pat. No. 3,897,367 to Lauder discloses metal oxide catalytic compounds which are also of the perovskite-type $ABO_3$ structure wherein 1–20% of the B site cations are ruthenium or platinum. The composition of the Lauder patent is an improvement over rare earth cobaltite catalytic compositions.

There exists a continuing need for improved catalyst which promote the combustion of carbon monoxide to carbon dioxide under conditions prevailing in a fluid catalytic cracking (FCC) regenerator.

DISCLOSURE OF THE INVENTION

The invention is a catalyst composition. The composition includes at least one Group VIII transition metal with at least one Group IB transition metal on a support.

The invention is also a process for producing a combustion promotor catalyst of carbon monoxide to carbon dioxide. The process includes mixing aqueous solutions of effective concentrations of at least one Group VIII transition metal and at least one Group IB transition metal. Then, the mixed, aqueous solutions are injected under pressure onto a support, e.g., any type of alumina, such as alpha ($\alpha$) or gamma ($\gamma$) alumina. In an embodiment of the present invention, the mixed aqueous solutions are injected under pressure on to microspheroidal alumina powder, to impregnate the micro-spheroidal alumina powder. The impregnated microspheroidal alumina powder is then dried.

BEST MODE FOR CARRYING OUT THE INVENTION

The invention is a catalyst composition and its use in an FCC unit. The composition includes at least one Group VIII transition metal and at least one Group IB transition metal on a support. The catalyst composition promotes the combustion of carbon monoxide to carbon dioxide.

A combination of metals, including two transition metals, is used in the catalyst composition. The two transition metals include one transition metal from Group VIII of the Periodic Table, such as palladium (Pd), and one transition metal from Group IB of the Periodic Table, such as copper (Cu). The catalyst of the present invention is effective and does not produce undesirably high concentrations of coke and/or light gas.

The inventive catalyst composition includes an -effective concentration of Group VIII transition metal or metal oxide and an effective concentration of Group IB transition metal or metal oxide on a support, preferably an alumina support, such as microspheroidal alumina. The preferred Group VIII transition metal is Pd. The preferred Group IB transition metal is Cu. The present invention does not require the presence of expensive components, such as platinum or ruthenium.

The preferred support is microspheroidal alumina. However, other supports can be employed, such as zeolites (both natural and/or synthetic), metallosilicates, crystalline silicoaluminum phosphates ("SAPO"), crystalline aluminum phosphates ("ALPO"), crystalline metallaluminum phosphates ("MAPO"), alumina, titania, zirconia, silica-aluminas, spinels, e.g., magnesium aluminate spinels, clays, e.g., palygorskites, smectites, kaolins and chlorites, hydrotalcites, ceramic materials, equilibrium or spent FCC catalysts ("E-cat"), and other inorganic oxide and oxide combinations. These supports can be used "as is" or they can be used after being enhanced or modified by acid and/or alkali leaching or ion-exchange procedures, by heat treatment such as calcination, or by impregnation with performance enhancers. It has been found particularly suitable to employ silica-aluminas, an E-cat, spinels, such as magnesium aluminate spinels, and clays, such as palygorskites, smectites, kaolins and chlorites as catalyst supports in accordance with the present invention.

The supports described above should also possess specific physical properties as a support for a fluid catalytic cracking (FCC) additive. These properties are as follows: a microspheroidal shape is preferred—the product must be easily fluidizable; an average particle size (APS) of 50–350 microns is desired with 65–85 micron being typical; the support should have a high degree of thermal stability (the particles see temperatures up to 1400° F., as such, organic materials are not suitable because they are combusted at lower temperatures); a hard particle is required, hardness is essential due to the tough abrasive environment of the FCC unit. The hardness is measured as the "Attrition Index" of the material. Using a Davidson Index (DI) measurement as developed by Grace-Davidson, a DI of less than 30 is preferred and less than 10 is optimal. The catalyst surface area should range between 20–600 $m^2/g$ to have a "surface" for impregnation of the active metals. Typical surface areas range from 80–250 $m^2/g$.

The invention is also a process for producing a combustion promotor catalyst of carbon monoxide to carbon dioxide. The process includes the following steps. Mixing of aqueous solutions of effective concentrations of at least one Group VIII transition metal and at least one Group IB transition metal. Injecting the mixed, aqueous solutions under pressure into microspheroidal alumina powder to impregnate the microspheroidal alumina powder. Drying the impregnated microspheroidal alumina powder is then performed.

The catalyst composition in accordance with preferred embodiments of the present invention comprises palladium and copper impregnated on an alumina support. The amount of palladium and copper are employed for optimum combustion of carbon monoxide to carbon dioxide under FCC regenerator conditions. It was unexpectedly found that a mixture of palladium and copper impregnated on alumina synergistically promotes the combustion of carbon monoxide to carbon dioxide under FCC regenerator conditions.

One having ordinary skill in the art can easily optimize the amount of each component to achieve such objectives. For example, it has been found that a weight ratio of palladium:copper in excess of about 2:1 achieves synergistic combustion of carbon monoxide to carbon dioxide under FCC regenerator conditions. In a preferred embodiment, 350 ppm of palladium and 150 ppm of copper are impregnated on an alumina support.

The desired aqueous solutions can be made by dissolving salts of the metallic components. Next, alumina powder is placed in a mixer. The solutions are added to a liquid delivery device. The mixer is started allowing the powder to tumble. The liquid delivery device is pressurized and the liquid is sprayed onto the tumbling powder. The impregnated material is then oven dried to reduce the moisture content to less than 10%. The material is then ready for packaging and shipment.

The catalyst composition of this example can be added to catalysts or applied to radiators of automobiles to filter air. Alternatively, the catalyst composition can be added to the regenerator of a fluid catalytic cracking unit to convert carbon monoxide to carbon dioxide.

What is claimed is:

1. An FCC composition comprising:
   a combustion promoter catalyst containing palladium and copper in a weight ratio of palladium to copper greater than about 2:1; and
   a FCC catalyst, wherein the combustion promoter catalyst promotes the combustion of carbon monoxide to carbon dioxide under FCC regenerator conditions.

2. The composition according to claim 1, wherein the combustion promoter catalyst does not contain ruthenium.

3. The composition according to claim 1, comprising an alumina support.

4. The composition according to claim 3, wherein the alumina support comprises microspheroidal alumina particles.

5. An FCC composition comprising:
   a combustion promoter catayst containing palladium and copper having a palladium:coppermole ratio of up to 1.4; and
   a FCC catalyst, wherein the combustion iromoter catalyst promotes the combustion of carbon monoxide to carbon dioxide under FCC regenerator conditions.

6. The composition according to claim 5, wherein the palladium:copper mole ratio is 1.4.

* * * * *